United States Patent Office 3,096,321
Patented July 2, 1963

3,096,321
WATER-INSOLUBLE MONOAZO-DYESTUFFS
Joachim Ribka, Offenbach (Main), Germany, assignor to Farbwerke Hoechst Aktiengesellschaft vormals Meister Lucius & Brüning, Frankfurt am Main, Germany, a corporation of Germany
No Drawing. Filed June 29, 1961, Ser. No. 120,512
Claims priority, application Germany July 2, 1960
3 Claims. (Cl. 260—193)

The present invention provides new valuable water-insoluble monoazo-dyestuffs and a process for their manufacture; more particularly it provides new water-insoluble monoazo-dyestuffs having the general formula

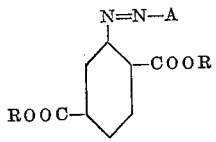

wherein A represents the radical of an azo-component containing a ketomethylene group which is capable of coupling and R represents a lower alkyl or a cycloalkyl group.

I have found that valuable water-insoluble monoazo-dyestuffs are obtained by coupling the diazonium compounds of an amine having the general formula

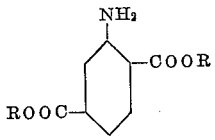

wherein R represents a lower alkyl or a cycloalkyl group, with coupling components containing a ketomethylene group which is capable of coupling and free from groups imparting solubility in water as for example sulfonic acid or carboxylic acid groups.

The amino compounds used as diazo components which in part are already known, can be prepared according to known methods for example by reacting 1-nitrobenzene-2.5-dicarboxylic acid with a lower aliphatic alcohol, for example with methyl alcohol, ethyl alcohol or propyl alcohol or with cyclohexyl alcohol in the presence of an acid as for example sulfuric acid and by subsequent reduction to form an amino compound or by nitrating dialkyl or dicycloalkyl esters of the benzene-1.4-dicarboxylic acid and subsequently reducing the nitro compound to form the amino compound.

In the process of the present invention there may be used as coupling components containing a ketomethylene group capable of coupling and being free from groups imparting solubility in water as for example sulfonic acid or carboxylic acid groups, for example the arylides of the acetoacetic acid whereby the aryl radical may contain one or several substituents, for example halogen atoms, alkyl, alkoxy, aryloxy, acylamino, trifluoromethyl, nitro, acyl, alkylsulfonic, cyano, carboxylic acid amide, carboxylic acid ester, sulfonic acid amide or sulfonic acid ester groups. Furthermore, there may be used as coupling components derivatives of the 5-pyrazolone such as for example 1-aryl-3-methyl-5-pyrazolone, 1-aryl-5-pyrazolone-3-carboxylic acid ester or 1-aryl-5-pyrazolone-3-carboxylic acid amides as well as 2.4-dihydroxyquinoline.

The preparation of the new dyestuffs is carried out according to known methods for example by coupling the diazonium compounds with the coupling components in an aqueous medium, advantageously in the presence of a dispersing agent, for example of a product obtained by the reaction of ethylene oxide and a fatty alcohol or an alkyl phenol or in the presence of an alkyl sulfonate or an alkylaryl sulfonate or in an organic solvent, for example in pyridine. In order to obtain a favorable granular condition of the azo dyestuffs it is advantageous, in some cases, to heat the reaction mixture after the coupling, for example to heat it for some time to boiling temperature.

The dyestuffs obtained according to the process of the present invention are water-insoluble pigments distinguished by a very good fastness to light. They are suitable for the preparation of colored lacquers or lacquer formers, for the preparation of solutions of acetyl cellulose, nitrocellulose, natural or artificial resins such as polymerisation products or condensation resins, for example aminoplasts, phenoplasts; polyvinyl compounds such, for example as polyvinyl chloride, polyvinyl acetate or polystyrene; polyolefins, for example polyethylene or polypropylene; polyacrylonitrile compounds, rubber, casein, silicones or silicone resins, as well as for pigment printing on a substratum, especially on textile fibers or on other flat structures such as paper. The new dyestuffs may also be used for other purposes, for example in finely dispersed form for dyeing rayon, made of viscose, cellulose ethers or cellulose esters, polyesters, polyamides or polyurethanes in the spinning solution or for dyeing paper.

The following example serves to illustrate the invention but it is not intended to limit it thereto, the parts being by weight unless otherwise stated and the relationship of parts by weight to parts by volume being the same as that of the kilogram to the liter.

*Example*

20.9 parts of 1-aminobenzene-2.5-dicarboxylic acid-dimethyl ester were stirred for some time with 80 parts by volume of 5 N-hydrochloric acid. Then the solution was diluted with water and ice and diazotized with 20 parts by volume of a 5 N-sodium nitrite solution. The diazo solution so obtained was clarified with kieselguhr and introduced at room temperature, while stirring, into an acetic suspension of 24 parts of 1-acetoacetylamino-4-acetylaminobenzene obtained by dissolving this compound in dilute sodium hydroxide solution and subsequently precipitating with glacial acetic acid in the presence of a reaction product from about 20 mols of ethylene oxide and 1 mol of oleyl alcohol. By simultaneously adding a dilute sodium acetate solution the reaction medium was kept acetic during the coupling. When the coupling was complete, the solution was heated to boiling temperature which temperature was maintained for 30 minutes. The dyestuff formed was filtered off, washed and dried. 42 parts of a yellow dyestuff powder were obtained.

The coupling may also be carried out in the presence of a carrier suitable for the preparation of color lakes.

By preparing a printing color from 5 parts of the dyestuff, 35 parts of aluminium hydroxide and 60 parts of boiled linseeed oil and by printing art paper with this color, greenish yellow prints having a very good fastness to light were obtained.

By using in the above-mentioned example instead of 1-aminobenzene-2.5-dicarboxylic acid-dimethyl ester, the equivalent quantity of 1-aminobenzene-2.5-dicarboxylic acid-diethyl ester or the equivalent quantity of 1-aminobenzene-2.5-dicarboxylic acid-di-N-propyl ester, dyestuffs having similar good properties were obtained.

In the following table there are given further dyestuffs which can be obtained according to the process of the present invention as well as the tints of the graphic prints obtained with these dyestuffs.

| Diazo component | Coupling component | Tint |
|---|---|---|
| 1-aminobenzene-2,5-dicarboxylic acid-dimethyl ester. | 1-phenyl-3-methyl-5-pyrazolone. | reddish yellow |
| Do | 1-(4'-acetylaminophenyl)-3-methyl-5-pyrazolone. | Do. |
| Do | 1-phenyl-5-pyrazolone-3-carboxylic acid amide. | Do. |
| Do | 1-acetoacetylamino-2,5-dimethoxy-4-chlorobenzene. | greenish yellow |
| Do | 1-acetoacetylamino-2,4-dimethoxy-5-chlorobenzene. | Do. |
| Do | 1-acetoacetylamino-2-methoxy-4-acetyl-amino-5-chlorobenzene. | Do. |
| Do | 1-acetoacetylamino-3,4-bis-acetylamino-benzene. | Do. |
| Do | 1-acetoacetylamino-2-methoxy-5-acetylaminobenzene. | Do. |
| Do | 1-acetoacetylamino-2-acetylaminobenzene. | Do. |
| Do | 1-acetoacetylamino-2,4-dimethylbenzene. | Do. |
| Do | 1-acetoacetylamino-2-methyl-4-chlorobenzene. | Do. |
| Do | 2,4-dihydroxyquinoline. | yellow. |
| Do | 1-acetoacetylamino-naphthalene. | greenish yellow |
| Do | 1-acetoacetylamino-2-methoxy-4-acetylaminobenzene. | Do. |
| Do | 1-acetoacetylamino-2,4-dimethoxybenzene. | Do. |
| Do | 1-acetoacetylamino-2,5-dimethoxybenzene. | Do. |
| Do | 1-acetoacetylamino-2-methoxy-5-methylbenzene. | Do. |
| Do | 1-acetoacetylamino-4-ethoxybenzene. | Do. |
| Do | 1-acetoacetylamino-4-benzoylaminobenzene. | Do. |
| Do | 1-acetoacetylamino-2,4-bis-acetylaminobenzene. | Do. |
| Do | 1-acetoacetylamino-2-methoxybenzene. | Do. |
| Do | 1-(4'-methylphenyl)-3-methyl-5-pyrazolone. | reddish yellow |
| Do | 1-(4'-chlorophenyl)-3-methyl-5-pyrazolone. | Do. |
| Do | 1-(2'-methylphenyl)-3-methyl-5-pyrazolone. | yellow. |
| Do | 1-(2'-chlorophenyl)-3-methyl-5-pyrazolone. | Do. |
| Do | 1-(4'-sulfamylphenyl)-3-methyl-5-pyrazolone. | Do. |
| 1-aminobenzene-2,5-dicarboxylic acid-dicyclohexyl ester. | 1-acetoacetylamino-2,5-dimethoxy-4-chlorobenzene. | greenish yellow. |

I claim:
1. The water-insoluble monoazo-dyestuffs having the formula

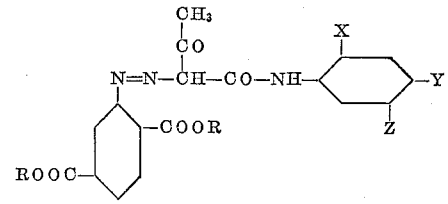

wherein X represents a member selected from the group consisting of a hydrogen atom, a lower alkyl group, a lower alkoxy group and an acetylamino group, Y represents a member selected from the group consisting of a hydrogen atom, a chlorine atom, a lower alkyl group, a lower alkoxy group, a benzoylamino group and an acetylamino group, Z represents a member selected from the group consisting of a hydrogen atom, a chlorine atom, a lower alkyl group, a lower alkoxy group and an acetylamino group, and R represents a lower alkyl group.

2. The water-insoluble monoazo-dyestuff having the formula

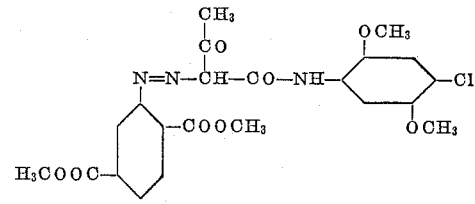

3. The water-insoluble monoazo-dyestuff having the formula

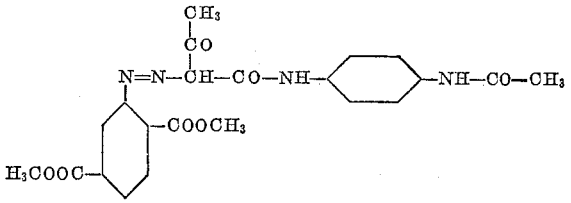

References Cited in the file of this patent
FOREIGN PATENTS
766,857    France _____ Apr. 23, 1934